United States Patent [19]

Unger et al.

[11] Patent Number: 4,932,853

[45] Date of Patent: * Jun. 12, 1990

[54] STAGED MOLD FOR ENCAPSULATING HAZARDOUS WASTES

[75] Inventors: Samuel L. Unger, Los Angeles; Rodney W. Telles, Alhambra; Hyman R. Lubowitz, Rolling Hills Estates, all of Calif.

[73] Assignee: Environmental Protection Polymers, Inc., Hawthorne, Calif.

[*] Notice: The portion of the term of this patent subsequent to Jul. 12, 2005 has been disclaimed.

[21] Appl. No.: 216,876

[22] Filed: Jul. 8, 1988

Related U.S. Application Data

[63] Continuation of Ser. No. 792,336, Oct. 29, 1985, Pat. No. 4,756,681.

[51] Int. Cl.$^5$ .................. B29C 43/20; G21F 9/36
[52] U.S. Cl. .................. 425/112; 252/628; 252/633; 264/0.5; 264/254; 425/125; 425/346; 425/413; 425/443; 425/452
[58] Field of Search .......... 425/88, 112, 120, 125, 425/126.1, 130, 193, 195, 253, 346, 351, 413, 416, 439, 441, 443, 450.1, 452, 454; 264/250, 254, 255, 256, 279.1, 0.5; 252/626, 628, 629, 633

[56] References Cited

U.S. PATENT DOCUMENTS

| | | | |
|---|---|---|---|
| 922,651 | 5/1909 | Williams | 249/137 |
| 1,930,167 | 10/1933 | Goodwin | 264/279.1 |
| 3,330,088 | 7/1967 | Dunlea, Jr. | 428/256 |
| 3,451,185 | 6/1969 | Tezuka . | |
| 3,497,580 | 2/1970 | Taylor-Smith | 425/130 |
| 4,222,889 | 9/1980 | Uerpmann | 252/628 |
| 4,234,632 | 11/1980 | Lubowitz | 428/2 |
| 4,297,827 | 11/1981 | Allison | 252/628 |
| 4,303,381 | 12/1981 | Aoki | 425/125 |
| 4,581,162 | 4/1986 | Kawamura et al. | 252/633 |
| 4,726,916 | 2/1988 | Aubert et al. | 252/628 |
| 4,756,681 | 7/1988 | Unger et al. | 425/112 |

Primary Examiner—James C. Housel
Attorney, Agent, or Firm—Timothy T. Tyson

[57] ABSTRACT

A staged mold for stabilizing hazardous wastes for final disposal by molding an agglomerate of the hazardous wastes and encapsulating the agglomerate. Three stages are employed in the process. In the first stage, a first mold body is positioned on a first mold base, a mixture of the hazardous wastes and a thermosetting plastic is loaded into the mold, the mixture is mechanically compressed, heat is applied to cure the mixture to form a rigid agglomerate, and the first mold body is removed leaving the agglomerate sitting on the first mold base. In the second stage, a clamshell second mold body is positioned around the agglomerate and the first mold base, a powdered thermoplastic resin is poured on top of the agglomerate and in the gap between the sides of the agglomerate and the second mold body, the thermoplastic is compressed, heat is applied to melt the thermoplastic, and the plastic is cooled jacketing the agglomerate on the top and sides. In the third stage, the mold with the jacketed agglomerate is inverted, the first mold base is removed exposing the former bottom of the agglomerate, powdered thermoplastic is poured over the former bottom, the first mold base is replaced to compress the thermoplastic, heat is applied to melt the new thermoplastic and the top part of the jacket on the sides, the plastic is cooled jacketing the bottom and fusing with the jacketing on the sides to complete the seamless encapsulation of the agglomerate.

6 Claims, 4 Drawing Sheets

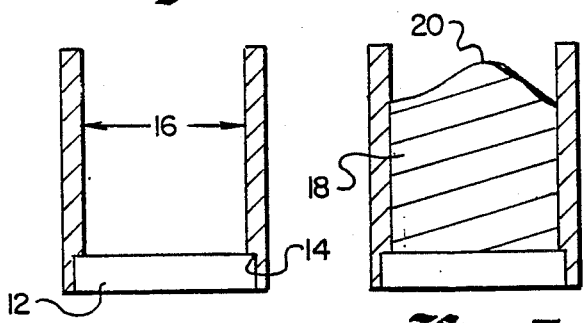
Fig.1. Fig.2. Fig.3.
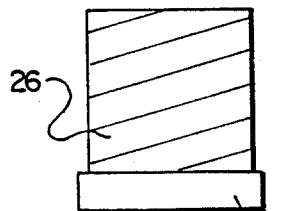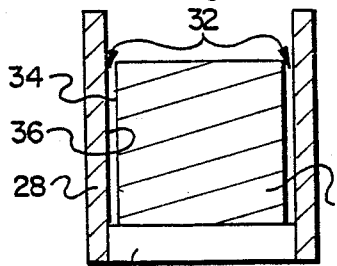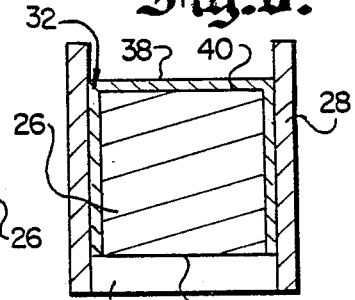
Fig.4. Fig.5. Fig.6.
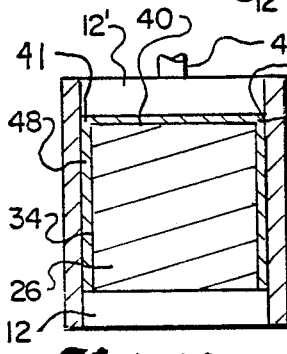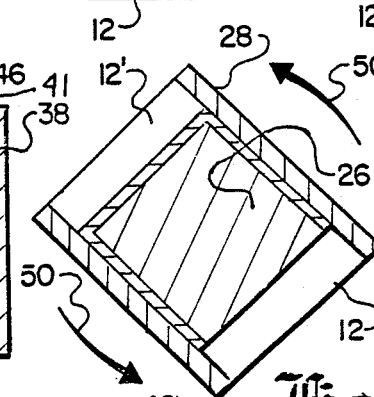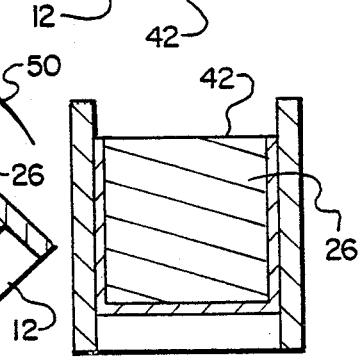
Fig.7. Fig.8. Fig.9.
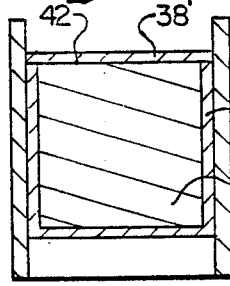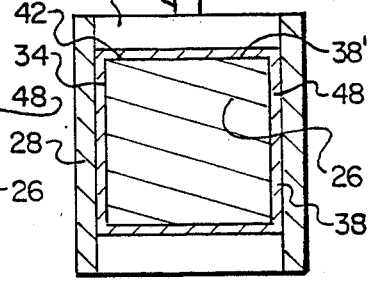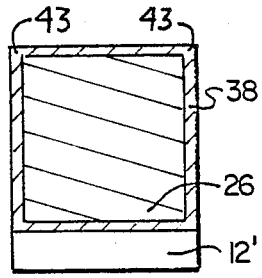
Fig.10. Fig.11. Fig.12.

STAGED MOLD FOR ENCAPSULATING HAZARDOUS WASTES

ORIGIN OF THE INVENTION

The invention described herein was made in the performance of work under a DOE contract and the U.S. Government may have certain rights in the invention. This is a continuation of co-pending application Ser. No. 792,336 filed on Oct. 29, 1985, now U.S. Pat. No. 4,756,681 issued July 12, 1988.

BACKGROUND OF THE INVENTION

1. Field of the Invention

The present invention pertains to the hazardous waste molding art, and more particularly, to a staged mold and method for molding a first material and then encapsulating the first material with a second material.

2. Background Art

A process is described in U.S. Pat. No. 4,234,632 for the stabilization of solid wastes by molding. The solid waste material is mixed with thermosetting resin and is charged into a first mold where the material is compressed and subjected to heat to form a rigid agglomerate. The agglomerate is covered by powdered thermoplastic resin in a second mold and the powder is therein consolidated by heating and solidified by cooling to jacket the agglomerate on the top and sides. The jacketed agglomerate is then inverted in the mold. The untreated bottom of the agglomerate is covered with additional powdered thermoplastic resin that is heated and solidified. During the heating and solidification of the resin on the bottom, the resin fuses with the sides to complete the encapsulation of the agglomerate. The purpose of the present invention is to provide a commercially viable full scale production apparatus and method for practicing the process of the above described patent for treating hazardous wastes for final disposal.

Other methods of stabilization of solid wastes by molding produce waste agglomerates and then cover them by surface treatment including the spraying or dipping of the agglomerates in a suitable coating material such as asphaltum or wrapping in a wire mesh as disclosed in U.S. Pat. No. 3,330,088. Alternatively, the agglomerated wastes may be wrapped in a vinyl sheet as disclosed in U.S. Pat. No. 3,451,185. The large scale processes described in these two patents are suitable for the management of general refuse but are unsuitable for achieving high performance management of low energy radioactive wastes and industrial hazardous wastes. The art described in U.S. Pat. No. 4,234,632, in contrast, yields stabilized hazardous wastes that resist harsh environmental stresses due to leaching, overburden, alternative wet and dry conditions, alternative freezing and thawing conditions, and mechanical impact.

Other methods of disposing of wastes include confining in plastic or metal containers, mixing wastes and binder materials such as cements and resins together, and solidifying mixtures of wastes and binders in containers. All of these methods have significant disadvantages. Both plastic and metal containers have a high relative initial cost. Containers are subject to such problems as ineffective sealing and corrosion which eventually allows leaching and seepage of the contents. Containment of wastes in cement or resin binders pose similar cost and leaching problems. Even the combination of confining waste and binder mixtures in containers does not assure effective waste stabilization due to the shortcomings of the containers.

Therefore, currently available large scale waste handling techniques are expensive and unsuitable for the management of hazardous wastes for final disposal because the potential exists for leaching and seepage of the wastes. Consequently, a need exists for improvements in the large scale management of hazardous wastes.

SUMMARY OF THE INVENTION

The present invention provides a staged mold and method designed to satisfy the aforementioned needs. In the first of three stages, a large volume of the hazardous waste first moldable material is molded into a rigid agglomerate. In the second stage, a thin layer of a protective thermoplastic second material is molded on the agglomerate to jacket the sides and top. In the third stage, the jacketed agglomerate and mold are inverted and the second material is molded onto the former bottom and fused with the jacket on the sides to complete the seamless encapsulation of the agglomerate. The relatively gentle handling of the molded product allowed by the equipment and method makes possible the large scale management of hazardous wastes. A large volume of hazardous wastes is encapsulated by a thin layer of the protective thermoplastic second material. The protective second material binds with the rigid agglomerate providing an encapsulated waste agglomerate that is highly resistant to leaching and seepage.

In the first stage, a first mold body is combined with a first mold base to provide a receptical that is loaded with the first moldable material. A first mold top is pressed into the first mold body and onto the first moldable material to compress the first moldable material. Heat is applied curing the first moldable material into a rigid agglomerate. The first mold top and body are removed leaving the agglomerate sitting on the first mold base. One of the features of the present invention is the use of the first mold base in all three stages of the molding process. The use of the same mold base is particularly advantageous in the case of hazardous wastes by enabling the minimization of contaminated equipment. The use of the same mold base and the changing of the mold bodies around the agglomerate and base without disturbing the agglomerate also allows larger volumes of wastes to be processed with safety than would be possible where the agglomerate has to be moved from one mold to another.

In the second stage, a second mold body is placed around the agglomerate and the first mold base. The second mold body provides a small gap between the sides of the agglomerate and the second mold body. The second moldable material is loaded into the gap and over the top of the agglomerate and compressed by a second mold base. Heat is applied to melt the second moldable material which is then cooled to jacket the sides and top of the agglomerate. One of the features of the preferred embodiment is a second mold body having the form of a clamshell that is opened to surround the rigid agglomerate sitting on the first mold base at the start of the second stage and is also opened to be removed from the encapsulated agglomerate at the end of the third stage. The clamshell design allows the agglomerate to be processed with a minimum of disturbance by moving around the agglomerate as the agglomerate sits on the mold base. In addition, the clamshell allows the second mold body to be pulled perpendicularly off the jacketed thermoplastic sides of the agglomerate. A thinner layer of the thermoplastic is therefore possible than would be possible with a traditional mold that is removed over an end of the agglomerate. Also no draft is required in the second mold body when removal is perpendicular to the molded material allowing a uniform thin layer of thermoplastic to be jacketed on the sides of the agglomerate.

In the third stage, the first and second mold bases, the second mold body, and the jacketed agglomerate are inverted together and the first mold base is removed to expose the former bottom of the agglomerate. A measured amount of the second moldable material is loaded onto the former bottom of the agglomerate. The first mold base is returned to the second mold body to compress the second moldable material for molding. Heat is applied to melt the new second moldable material and the top portion of the side jacket. The second moldable material is then cooled to jacket the former bottom and fuse with the side jacket to complete the seamless encapsulation of the agglomerate. The lack of a seam in the final jacket is a significant advantage of the present method by eliminating any weak point in the jacket. The first mold base is then lifted and the second mold body removed leaving the encapsulated agglomerate sitting on the second mold base.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a center sectional view of an empty first mold body on a first mold base in accordance with the present invention.

FIG. 2 is a sectional view similar to FIG. 1 with a first moldable material loaded into the center;

FIG. 3 is a sectional view similar to FIG. 2 with a first mold top compressing the first moldable material;

FIG. 4 is a center sectional view of a rigid first moldable material agglomerate sitting on the first mold base;

FIG. 5 is a sectional view similar to FIG. 4 with a second mold body positioned around the first mold base;

FIG. 6 is a sectional view similar to FIG. 5 with a second moldable material poured over the top and sides of the agglomerate;

FIG. 7 is a sectional view similar to FIG. 6 with a second mold base on top under compression from a shaft;

FIG. 8 is a sectional view similar to FIG. 7 with the shaft removed and the mold and partially jacketed agglomerate being inverted;

FIG. 9 is the sectional view of FIG. 7 inverted 180° with the first mold base and shaft removed;

FIG. 10 is a sectional view similar to FIG. 9 with the second moldable material poured over the former bottom of the agglomerate and jacket;

FIG. 11 is a sectional view similar to FIG. 10 with the first mold base replaced on the second mold body and under compression from the shaft;

FIG. 12 is a center sectional view of the encapsulated agglomerate sitting on the second mold base;

DESCRIPTION OF THE PREFERRED EMBODIMENTS

Figure 13:
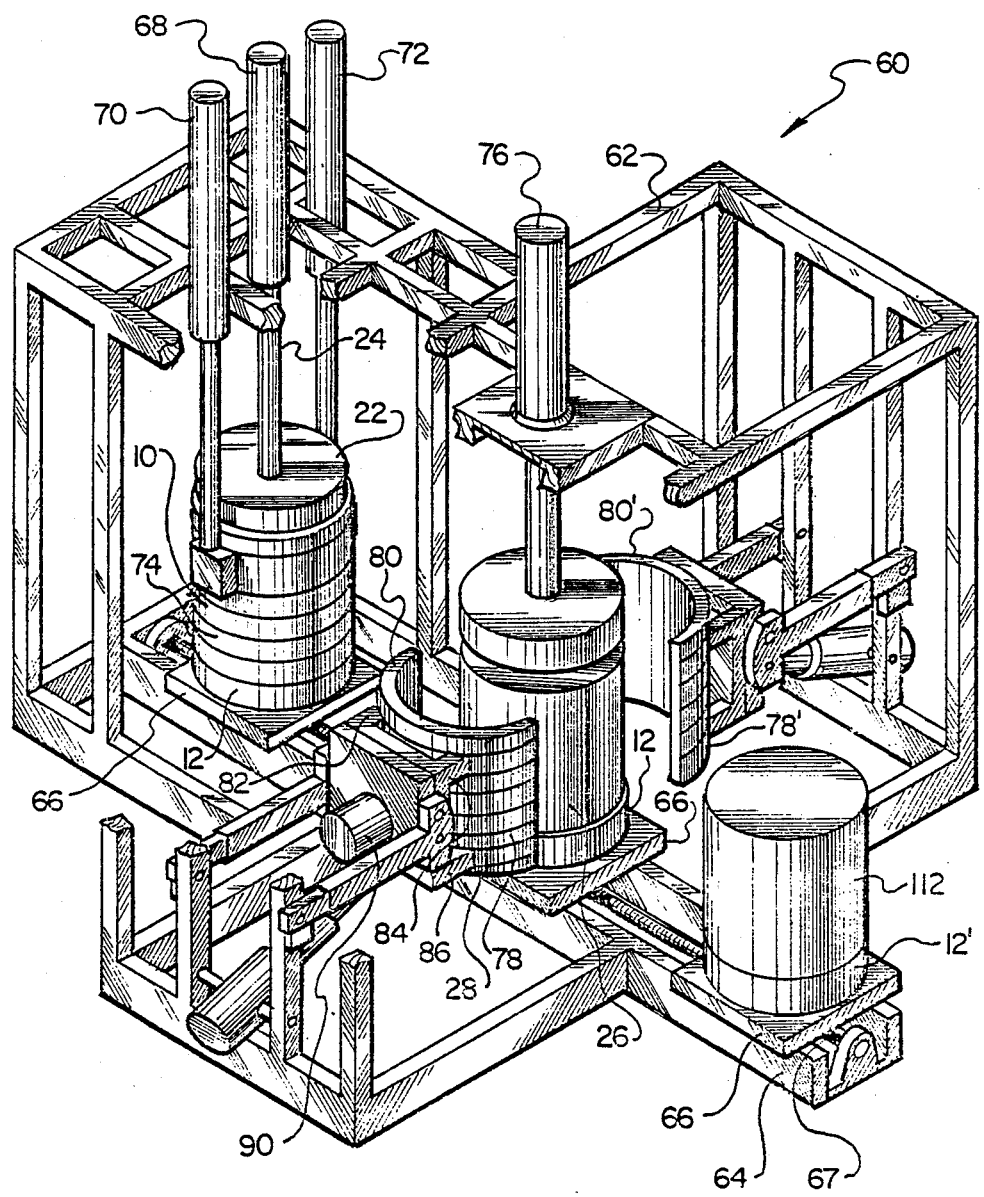
FIG. 13 is a perspective view of the preferred embodiment of the staged mold of the present invention with a portion of the frame cut away.

Referring initially to FIGS. 1 through 12, there are illustrated center sectional views of all of the molds and moldable materials for molding a first moldable material and then encapsulating the resulting agglomerate with a second moldable material in accordance with the present invention. The figures are presented in sequence with FIG. 1 illustrating the first step and FIG. 12 illustrating the last step.

The present invention may be utilized for the purpose of molding any moldable material and then encapsulating the first moldable material with another moldable material. For the purposes of this description, the preferred materials described in U.S. Pat. No. 4,234,632 are utilized.

The first moldable material is preferably a mixture of a liquid thermosetting resin such as 1,2-polybutadiene, powdered high density polyethylene, and hazardous wastes. The wastes may be either particulate or mixed with a liquid in the form of a sludge. Examples of particulate wastes suitable for treatment in this process include those holding heavy metal contaminants such as arsenic, lead, mercury, and radioactive materials. After thorough blending, the resin treated particulate wastes may be free flowing powders and are stable under atmospheric conditions thus permitting the subsequent agglomeration to be scheduled as desired. An example of a sludge suitable for treatment is one holding PCBs.

During heating, polybutadiene undergoes thermosetting thereby creating a rigid matrix for the wastes. Thermosetting is initiated by peroxides such as employed in the peroxide vulcanization of rubber. The 1,2-configuration polybutadiene gives a high yield of chemical cross-links in a fast chemical reaction. In the course of heating and reaction, the high density polyethylene blends within and is chemically incorporated into the polybutadiene. The resulting polymers have singly bonded carbon backbones which provide inherent resistance to degradation by oxidation, hydrolysis, radiation, and permeation by water. Once the thermosetting of the polybutadiene has occurred, reheating does not remelt the plastic.

The second moldable material used to encapsulate the rigid agglomerate is preferrably high density or linear low density powdered polyethylene. The mold employed provides a gap of approximately ¼ inch to the surface of the agglomerate that is filled with the powdered polyethylene. Upon molding, the polyethylene forms a tough jacket that is mechanically and chemically locked to the surface of the agglomerate. Polyethylene is a thermoplastic that melts on reheating. The remelting of a portion of the plastic jacket is useful in the method of the present invention because it allows additional powdered polyethylene to be added at a later stage of the encapsulation process to melt and fuse with the previously molded polyethylene to complete the seamless encapsulation of the agglomerate.

FIGS. 1 through 4 illustrate the first stage position in the molding process which provides a means for molding the first moldable material to create the rigid agglomerate. FIG. 1 is the first step in the process and shows a center sectional view of an empty first mold body 10 combined with a first mold base 12. In the preferred embodiment, the first mold body 10 is cylindrical and the first mold base 12 is circular. A step 14 in the bottom of the first mold body 10 provides vertical and horizontal registration of the first mold body 10 on the first mold base 12. The inner diameter of the first mold base 12 represented by the arrow 16 determines the outer diameter of the agglomerate.

FIG. 2 is a sectional view similar to FIG. 1 with a first moldable material such as a hazardous waste and binder mixture 18 described above loaded into the center. Depending upon the viscosity of the mixture 18, a peak 20 or voids might be formed.

FIG. 3 is a sectional view similar to FIG. 2 with a first mold top 22 positioned inside the first mold body 10 to apply pressure to compress the mixture 18 and eliminate any peaks 20 or voids. A shaft 24 connected to a piston provides a first compression means to force the first mold top 22 down. Additional mixture 18 may be loaded into the first mold body 10 by withdrawing the first mold top 22, adding additional mixture 18, and replacing the top 22. When the amount of the mixture 18 is satisfactory, heat is applied causing the polybutadiene to themoset creating a rigid agglomerate 26 of the mixture 18. Complete curing occurs when the center of the mixture 18 reaches approximately 300° F. Cure times are dependent upon the proportion of the waste material, the proportion of polybutadiene, the shape of the mold, the heat of the mold, and the bulk of the mixture 18. In the preferred embodiment, the volume of the mixture 18 is approximately 50 gallons.

FIG. 4 is a center sectional view of the agglomerate 26 sitting on the first mold base 12 after removal of the first mold body 10 and the top 22 shown in FIG. 3. Shrinkage of the agglomerate 26 away from the first mold body 10 occurs as the agglomerate 26 cools facilitating the removal of the mold body 10.

FIGS. 5 through 7 illustrate the second stage position in the molding process providing a means for jacketing the agglomerate 26 on the sides, top, and corners between the sides and top with a second molded material. FIG. 5 is a sectional view similar to FIG. 4 with a second mold body 28 combined with the first mold base 12. The second mold body 28 is also cylindrical. The horizontal registration of the second mold body 28 on the first mold base 12 is determined by the diameter of the first mold base 12. The second mold body 28 creates a gap 32 of approximately ¼ inch between the sides 34 of the agglomerate 26 and the inner surface 36 of the second mold body 28 for molding a second moldable material such as powdered polyethylene around the sides 34.

FIG. 6 is a sectional view similar to FIG. 5 with powdered polyethylene 38 poured over the top 40 of the agglomerate 26 and into the gap 32 to load the first mold base 12 and the second mold body 28. The bottom 42 of the agglomerate 26 remains sitting on the first mold base 12.

FIG. 7 is a sectional view similar to FIG. 6 with a second mold base 12' on top of the polyethylene 38. The second mold base 12' is identical to the first mold base 12 allowing interchange. A second compression means represented by a shaft 46 compresses the second mold base 12' onto the polyethylene 38. The powdered polyethylene 38 is then heated to melt and consolidate the polyethylene 38. The polyethylene 38 is cooled to form a jacket 48 on the sides 34, the top 40, and the corners 41 between the sides and the top of the agglomerate 26.

FIGS. 8 through 12 illustrate the third stage position of the molding process which provides a means for inverting the jacketed agglomerate 26 and a means for molding the second moldable material on the former bottom 42 and corners 43 between the bottom and sides 34 to jacket the former bottom 42 of the agglomerate 26 and complete the seamless encapsulation of the agglomerate 26 by fusing with the second molded material on the sides. FIG. 8 is a sectional view similar to FIG. 7 with the shaft 46 removed and the jacketed agglomerate 26, second mold body 28, and first and second mold bases 12 and 12' being inverted as indicated by the arrows 50.

FIG. 9 is the sectional view of FIG. 7 inverted 180° with the first mold base 12 and the shaft 46 removed exposing the unjacketed former bottom 42 of the agglomerate 26.

FIG. 10 is a sectional view similar to FIG. 9 with a measured amount of powdered polyethylene 38' loaded over the former bottom 42 of the agglomerate 26 and the jacket 48 adjacent the former bottom 42 sufficient to form a jacket ¼ inch thick.

FIG. 11 is a sectional view similar to FIG. 10 with the first mold base 12 replaced in the second mold body 28 and onto the new powdered polyethylene 38'. The first mold base 12 is under compression from the shaft 46 to create sufficient pressure to mold the powdered polyethylene 38'. The polyethylene 38, 38' adjacent the first mold base 12 is then heated to melt and consolidate the new powdered polyethylene 38' added at this step and melt the top portion of the polyethylene 38 of the jacket 48. When the polyethylene 38, 38' is cooled, the new polyethylene 38' jackets the former bottom 42 and fuses with the polyethylene 38 on the sides 34 to complete the seamless encapsulation of the agglomerate 26. As noted above, the remelting of a portion of polyethylene jacket 48 on the sides 34 is useful in the method of the present invention because it allows the former bottom 42 to be jacketed at this later stage and fuse with the previously molded jacket 48 on the sides 34 producing a seamless encapsulation of the agglomerate 26.

FIG. 12 is a center sectional view of the agglomerate 26 encapsulated by the polyethylene 38 sitting on the second mold base 12' after disassembly and removal of the first mold base 12 and the second mold body 28 of FIG. 11.

FIGS. 1 through 12 clearly illustrate that a large volume of waste mixture 18 may be molded into an agglomerate 26 and covered by a thin layer of polyethylene 38 by relatively gentle handling. The polyethylene 38 is mechanically and chemically locked to the surface of the agglomerate 26. The agglomerate 26 may then be subjected to relatively rough handling without danger of the polyethylene 38 becoming punctured or cut.

FIG. 13 is a perspective view of the preferred embodiment, generally designated 60, of the staged mold of the present invention with a portion of the frame 62 cut away. All of the stages illustrated in the FIGS. 1 through 12 are performed in the staged mold 60 starting at the left and moving to the right along the track 64. Multiple operations may take place in the staged mold 60 as illustrated in FIG. 13. Trucks 66 move along the track 64 propelled by a screw 67 to move the process between the stages as needed.

The first stage of the molding process includes the steps illustrate in FIGS. 1 through 4 and takes place under the first compression means provided by a piston 68. The circular first mold base 12 is positioned on the truck 66 and the cylindrical first mold body 10 is lowered by the pistons 70 and 72 from the top of the frame 62 to the first mold base 12. The first mold top 22 is lowered by the shaft 24 from the piston 68 into the first mold body 10 to complete the first stage configuration illustrated in FIG. 13. The process taking place is the curing of the agglomerate 26 as described in conjunction with FIG. 3. Heat is applied by the heating bands 74. After the curing process is completed, the first mold body 10 and top 22 are drawn up by the pistons 68, 70, and 72 leaving the agglomerate 26 sitting on the first mold base 12 as represented in FIG. 4.

The second stage of the molding process includes the steps illustrated in FIGS. 5 through 7 and takes place under the second compression means provided by a piston 76. As shown in FIG. 13, the second mold body 28 is open and the agglomerate 26 has just entered the second stage of the molding process.

Figure 14:
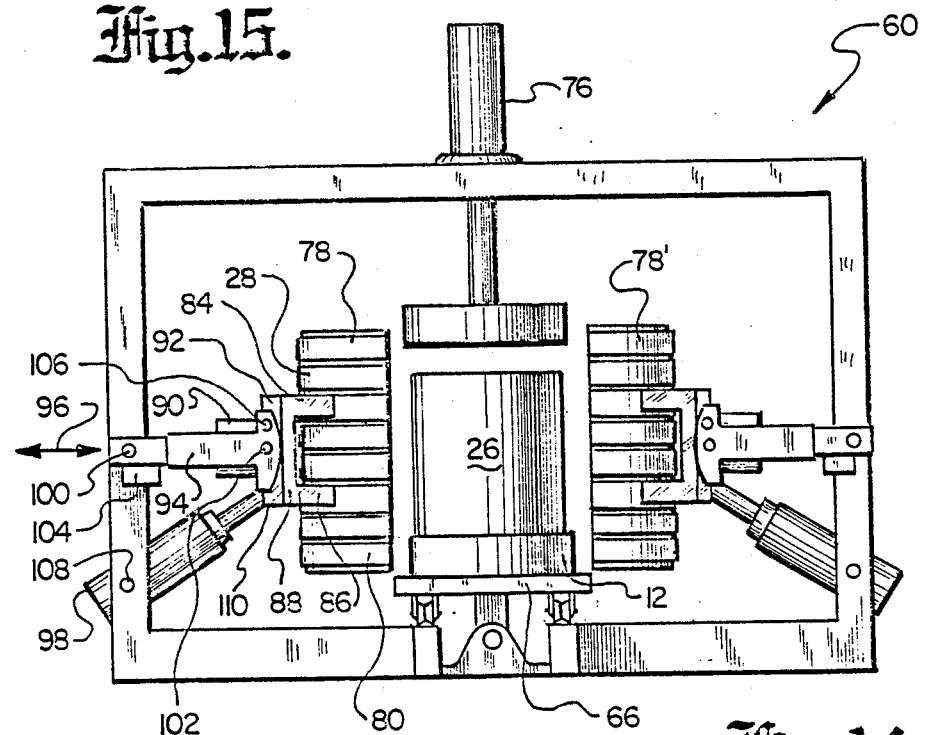
FIG. 14 is a right side elevational view of the preferred embodiment of FIG. 13.

FIG. 14 is a right side elevational view of the staged mold 60 of the preferred embodiment of FIG. 13 illustrating the same position. As shown in FIGS. 13 and 14, the second mold body 28 has left and right mold halves 78 and 78', respectively. The clamshell permits the second mold body 28 to open and move around the agglomerate 26 prior to being positioned on the first mold base 12. The clamshell also permits the second mold body 28 to open at the completion of the encapsulation process and be removed from the agglomerate 26 without movement of the agglomerate 26 from the second mold base 12' as described in conjunction with FIG. 12. Another advantage of the clamshell is the ease of removing the second mold body 28 from the thin layer of polyethylene 38 illustrated in FIG. 12. The clamshell design allows the second mold body 28 to be pulled off perpendicular to the polyethylene 38. Little or no mold wax or releasing agent is needed. The clamshell also eliminates the need for draft in the second mold body 28 as would be needed in a one piece mold where removal must occur over one end of the agglomerate 26. The elimination of draft in the second mold body 28 allows the jacket 48 on the sides 34 of the agglomerate 26 to have a uniform thickness from top to bottom as shown in FIG. 7 thereby minimizing the plastic required.

The left and right halves 78 and 78' are identical and are operated in the same manner. The left half 78 has a curved mold portion 80 mounted with legs 82, 84, and 86 to a flat support plate 88. Another leg that is not shown is located on the far corner of the plate 88. An axle that is also not shown is positioned perpendicular to the middle of the flat support plate 88. The axle fits into a motor 90 mounted in the middle of a flat foundation plate 92. As noted in conjunction with FIG. 8, the agglomerate 26, first and second mold bases 12 and 12', and second mold body 28 are inverted during one of the steps in the encapsulation process. During the rotation step, the motor 90 rotates the axle to rotate the entire mold assembly illustrated in FIG. 8.

The foundation plate 92 is coupled to a linear bearings 94 that allows movement of the left half 78 toward and away from the agglomerate 26 as indicated by the arrow 96. Movement of the left half 78 along the linear bearing 94 is controlled by a piston 98. The linear bearing 94 is coupled to the frame 62 on the left end by a pivot 100 and to the flat foundation plate 92 on the right end by a pivot 102. A block 104 prohibits movement of the linear bearing 94 below the horizontal on the pivot 100 while permitting vertical rotation as illustrated below in conjunction with FIG. 16. Similarly, a pin 106 prohibits rotation of the left mold half 78 about the pivot 102 when the linear bearing 94 is retracted as illustrated in FIG. 14. Removal of the pin 106 prior to the elevated rotation step illustrated in FIG. 16 permits the left mold half 78 to rotate about the pivot 102 and be elevated by the piston 98. The piston 98 is held in position by the pivots 108 and 110 at the ends. As noted above, the right half 78' is identical to the left half 78 and is operated in the same manner.

Figure 15:
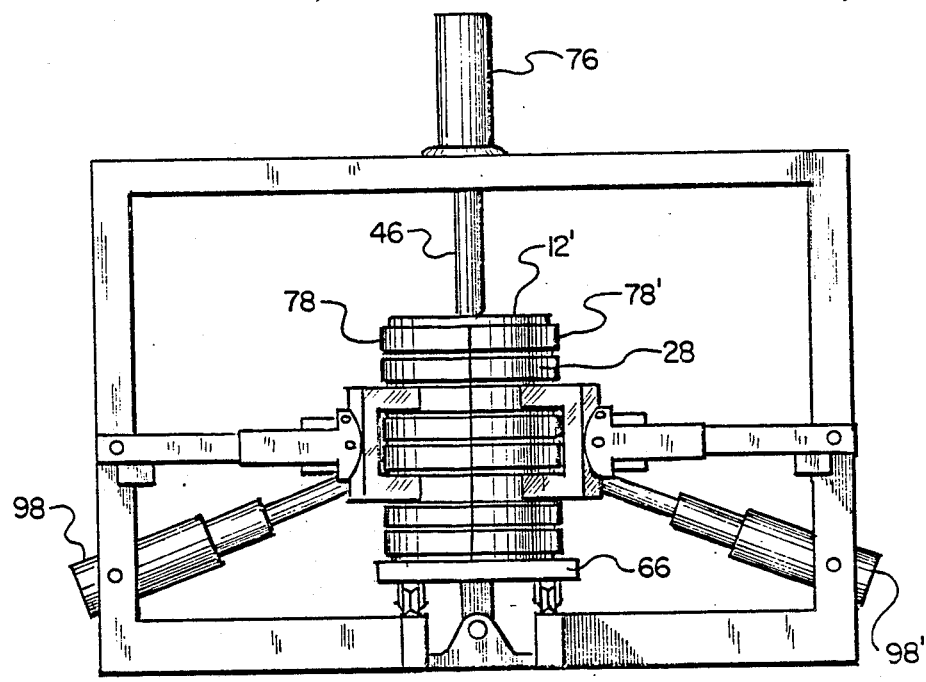
FIG. 15 is a right side elevational view similar to FIG. 14 with the molding process at the step illustrated by FIG. 7.

FIG. 15 is a right side elevational view similar to FIG. 14 with the molding process at the step illustrated by FIG. 7. The right and left halves 78 and 78' have been closed by the pistons 98 and 98' and the second mold base 12' has been lowered into the second mold body 28. After the steps have taken place that are described in conjunction with FIG. 7 above, the right and left halves 78 and 78' remain closed and the piston 76 retracts the shaft 46 to lift the entire mold assembly off the truck 66 in preparation for the inversion step illustrated in FIG. 8.

Figure 16:
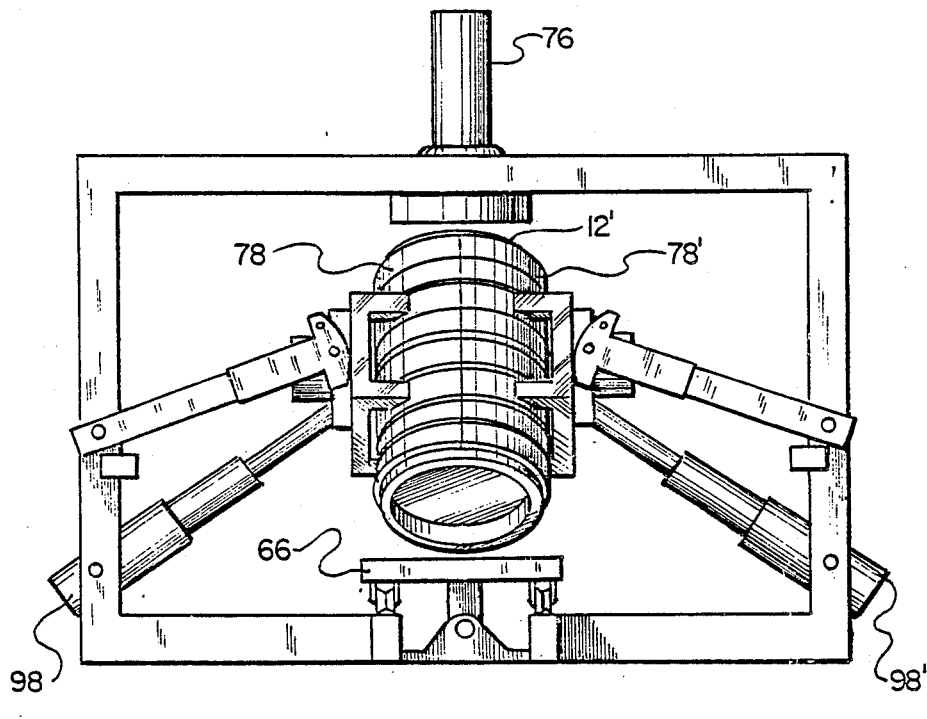
FIG. 16 is a right side elevational view similar to FIGS. 14 and 15 with the molding process at the step illustrated by FIG. 8.

FIG. 16 is a right side elevational view similar to FIGS. 14 and 15 with the molding process at the step illustrated in FIG. 8 where the entire mold assembly is being rotated to initiate the steps at the third stage position. Prior to being rotated, the entire mold assembly is lifted off the truck 66 by the piston 76 as described above in conjunction with FIG. 15. The pistons 98 and 98' are then pressurized to hold the left and right halves 78 and 78' above the truck 66 while the piston 76 is detached and retracted from the second mold base 12' to permit the inversion to take place.

The third stage position of the molding process includes the steps illustrated in FIGS. 9 through 12 and also takes place under the piston 76 but inverted 180° from the second stage position. Once the encapsulation process is completed, the right and left halves 78 and 78' are retracted, the first mold base 12 in FIG. 11 is lifted, and the truck 66 is moved to the right along the track 64 to the right end as illustrated in FIG. 13 leaving the encapsulated agglomerate 112 on the second mold base 12'.

In view of the above, it may be seen that a staged mold and method are provided that permit the molding of a first material such as a mixture of a hazardous waste and a thermosetting plastic binder into an agglomerate and the encapsulation of the agglomerate with a second material such as a thermoplastic. The nature of the equipment and process minimizes the exposure of the operator and the environment to the waste materials being handled. In addition, the gentle handling of the molded products by the equipment and the process allow the encapsulation of a relatively large volume of hazardous waste by a thin jacket of thermoplastic. The resulting encapsulated hazardous waste agglomerate is highly resistant to leaching and seepage of the hazardous wastes into the environment. Of course, the structure and method may be variously implemented and variously used depending upon specific applications. Accordingly, the scope hereof shall not be referenced to the disclosed embodiment, but on the contrary, shall be determined in accordance with the claims as set forth below.

We claim:

1. A staged mold for molding a first molded material having a top, a bottom, sides, corners between the top and sides, and corners between the bottom and sides and encapsulating the first molded material by molding a second molded material on the first molded material, comprising:
   a first mold base;
   means for molding the first molded material on the first mold base with the first mold base at a first stage position;
   means for jacketing the first molded material on the top, sides, and corners between the top and sides with the second molded material with the first mold base at a second stage position;
   means for inverting the first molded material jacketed with the second molded material on the top, sides, and corners between the top and sides and the first mold base into a third stage position; and
   means for jacketing the first molded material on the bottom and corners between the bottom and sides with the second molded material and fusing with the second molded material on the sides to complete the encapsulation of the first molded material with the first mold base in the third stage position.

2. The staged mold according to claim 1 wherein the means for molding the first molded material includes a first mold body.

3. The staged mold according to claim 2 wherein the means for molding the first molded material further includes a first mold top.

4. The staged mold according to claim 1 wherein the means for jacketing the first molded material on the top, sides, and corners between the top and sides with the second molded material includes a second mold body creating a gap between the sides of the first molded material and the second mold body for molding the second molded material.

5. The staged mold according to claim 4 wherein the means for jacketing the first molded material on the top, sides, and corners between the top and sides further includes a second mold top.

6. The staged mold according to claim 5 wherein the second mold top is a second mold base identical to the first mold base.

* * * * *